United States Patent
Eagle et al.

(10) Patent No.: US 7,069,515 B1
(45) Date of Patent: Jun. 27, 2006

(54) METHOD AND APPARATUS FOR DISPLAYING MESSAGES IN COMPUTER SYSTEMS

(75) Inventors: Scott G. Eagle, Menlo Park, CA (US); David L. Goulden, Redwood City, CA (US); Anthony G. Martin, Los Altos, CA (US); Eugene A. Veteska, San Jose, CA (US)

(73) Assignee: Claria Corporation, Redwood City, CA (US)

( * ) Notice: Subject to any disclaimer, the term of this patent is extended or adjusted under 35 U.S.C. 154(b) by 0 days.

(21) Appl. No.: 10/152,204

(22) Filed: May 21, 2002

(51) Int. Cl.
*G06F 3/00* (2006.01)

(52) U.S. Cl. ...................... 715/747; 715/760
(58) Field of Classification Search ................ 345/733, 345/738, 760, 741, 745, 781; 715/738, 739, 715/740, 745, 746, 747, 744, 760, 962
See application file for complete search history.

(56) References Cited

U.S. PATENT DOCUMENTS

| | | | |
|---|---|---|---|
| 5,642,484 A | 6/1997 | Harrison, III et al. | |
| 5,819,092 A | 10/1998 | Ferguson et al. | |
| 5,854,897 A | 12/1998 | Radziewicz et al. | |
| 5,898,434 A | 4/1999 | Small et al. | |
| 5,933,811 A | 8/1999 | Angles et al. | |
| 5,937,037 A | 8/1999 | Kamel et al. | |
| 5,959,621 A * | 9/1999 | Nawaz et al. ................ | 345/733 |
| 6,014,502 A * | 1/2000 | Moraes ........................ | 709/219 |
| 6,029,141 A | 2/2000 | Bezos et al. | |
| 6,073,105 A | 6/2000 | Sutcliffe et al. | |
| 6,119,098 A | 9/2000 | Guyot et al. | |
| 6,133,912 A | 10/2000 | Montero | |
| 6,133,918 A | 10/2000 | Conrad et al. | |
| 6,141,010 A | 10/2000 | Hoyle | |
| 6,144,944 A | 11/2000 | Kurtzman, II et al. | |
| 6,151,596 A | 11/2000 | Hosomi | |
| 6,161,112 A * | 12/2000 | Cragun et al. ............ | 715/501.1 |
| 6,183,366 B1 | 2/2001 | Goldberg et al. | |
| 6,216,141 B1 * | 4/2001 | Straub et al. ................ | 715/513 |
| 6,222,520 B1 | 4/2001 | Gerszberg et al. | |
| 6,253,188 B1 | 6/2001 | Witek et al. | |
| 6,285,987 B1 | 9/2001 | Roth et al. | |
| 6,295,061 B1 | 9/2001 | Park et al. | |
| 6,297,819 B1 | 10/2001 | Furst | |
| 6,314,451 B1 | 11/2001 | Landsman et al. | |
| 6,314,457 B1 | 11/2001 | Schema et al. | |
| 6,317,761 B1 | 11/2001 | Landsman et al. | |
| 6,321,209 B1 | 11/2001 | Pasquali | |

(Continued)

OTHER PUBLICATIONS

PCT International Search Report for PCT/US03/13985 mailed Aug. 8, 2003; total of 2 sheets.

*Primary Examiner*—Kristine Kincaid
*Assistant Examiner*—Thanh Vu
(74) *Attorney, Agent, or Firm*—Okamoto & Benedicto LLP

(57) ABSTRACT

In one embodiment, a client computer receives messages from a server computer over a computer network. The messages are displayed in the client computer based on preference settings that may be configured by end-users. This advantageously gives end-users some control over messages provided to them. In one embodiment, end-users configure the preference settings to specify the number of messages they can be shown within a period time, when to display messages relative to the loading of a web page, and/or where to display messages. Embodiments of the present invention may be used in a variety of applications including in the delivery of advertisements over the Internet.

7 Claims, 10 Drawing Sheets

U.S. PATENT DOCUMENTS

| | | |
|---|---|---|
| 6,324,569 B1 | 11/2001 | Ogilvie et al. |
| 6,351,279 B1 | 2/2002 | Sawyer |
| 6,401,075 B1 | 6/2002 | Mason et al. |
| 6,442,529 B1 * | 8/2002 | Krishan et al. ............... 705/14 |
| 6,502,076 B1 | 12/2002 | Smith |
| 6,642,944 B1 * | 11/2003 | Conrad et al. .............. 345/781 |
| 6,686,931 B1 * | 2/2004 | Bodnar ........................ 345/741 |
| 6,771,290 B1 * | 8/2004 | Hoyle ......................... 345/745 |
| 2001/0037488 A1 | 11/2001 | Lee |
| 2002/0010626 A1 | 1/2002 | Agmoni |
| 2002/0019834 A1 | 2/2002 | Vilcauskas, Jr. et al. |
| 2002/0046099 A1 * | 4/2002 | Frengut et al. ............... 705/14 |
| 2002/0049633 A1 | 4/2002 | Paquali |
| 2002/0052785 A1 | 5/2002 | Tenenbaum |
| 2002/0154163 A1 | 10/2002 | Melchner |
| 2002/0169670 A1 | 11/2002 | Barsade et al. |
| 2002/0171682 A1 | 11/2002 | Frank et al. |
| 2002/0175947 A1 | 11/2002 | Conrad et al. |
| 2002/0194151 A1 | 12/2002 | Fenton et al. |

* cited by examiner

US 7,069,515 B1

METHOD AND APPARATUS FOR DISPLAYING MESSAGES IN COMPUTER SYSTEMS

BACKGROUND OF THE INVENTION

1. Field of the Invention

The present invention relates generally to computer systems, and more particularly to methods and apparatus for displaying messages in computer systems.

2. Description of the Background Art

The general availability of large computer networks such as the Internet has enabled end-users to readily access vast amounts of information. On the Internet, for example, there are web sites that provide news, educational and scientific materials, maps, on-line shopping, voice-over-IP service, music, etc. In fact, the types of information that are available on the Internet are limited only by the imagination of web site operators.

Web site operators can generate revenue by displaying advertisements to end-users who visit their web sites. An advertisement may be displayed on a web page, or on a separate window such as a pop-up or a banner. A window containing advertising typically includes an icon for manually removing the window, and a handle for dragging the window to a desired location on the computer screen. However, for the most part, end-users do not have much control over the window. The web site operator dictates how a window (and its advertisement) is displayed to end-users.

SUMMARY

The present invention relates to methods and apparatus for displaying messages in computer systems. The present invention may be used in a variety of applications including in the delivery of advertisements over the Internet.

In one embodiment, a client computer receives messages from a server computer over a computer network. The messages are displayed in the client computer based on preference settings that may be configured by end-users. This advantageously gives end-users some control over messages provided to them.

In one embodiment, end-users configure the preference settings to specify the number of messages they can be shown within a period time, when to display messages relative to the loading of a web page, and/or where to display messages.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

The invention is described in the context of advertisement delivery over the Internet. It should be understood, however, that the invention is not so limited and may be generally used in other applications where messages are displayed for viewing by end-users. Furthermore, it is to be noted that as used in the present disclosure, "advertising" or "advertisement" includes any type of message provided to end-users for the purpose of getting their attention on something. Typically but not necessarily, an advertisement is with regards to a product. However, an advertisement may also be related to an election campaign, a cause (e.g., "save the planet"), an announcement, etc.

Figure 1:
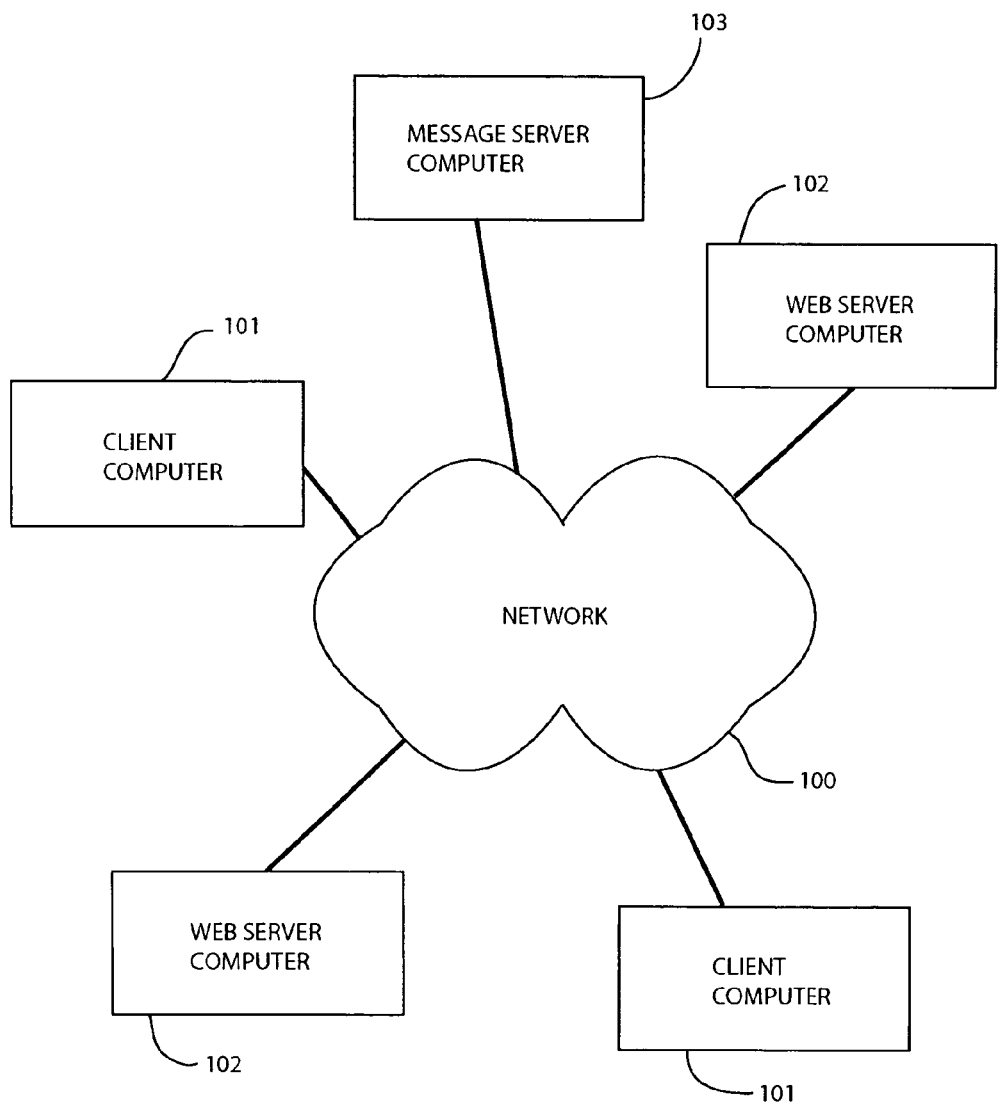
FIG. 1 shows a schematic diagram of a computer network in accordance with an embodiment of the present invention.

Referring now to FIG. 1, there is shown a schematic diagram of a computer network 100 in accordance with an embodiment of the present invention. Network 100 may include one or more client computers 101, one or more web server computers 102, one or more message server computers 103, and other computers not shown. Intermediate nodes such as gateways, routers, bridges, Internet service provider networks, public-switched telephone networks, proxy servers, firewalls, etc. are not shown for clarity. In the example of FIG. 1, network 100 includes the Internet; however, other types of computer networks may also be used. Computers may be coupled to network 100 using any type of connection without detracting from the merits of the present invention.

A client computer 101 is typically, but not necessarily, a personal computer such as those running the Microsoft Windows™, Apple Macintosh™, Linux etc. operating systems. An end-user may employ a suitably equipped client computer 101 to get on network 100 and access computers coupled thereto. For example, a client computer 101 may be used to access web pages from a web server computer 102. It is to be noted that the term "computer" includes any type of information processing device including personal digital assistants, digital telephones, wireless terminals, etc.

A web server computer 102 may be a web site containing information designed to attract end-users surfing on the Internet. A web server computer 102 may also include advertisements, downloadable computer programs, and products available for online purchase. A web server computer 102 may also be an ad server for delivering advertisements to a client computer 101.

A message server computer 103 may include the functionalities of a web server computer 102. Additionally, in one embodiment, a message server computer 103 may also include message units for delivery to a client computer 101. The message units may contain advertisements, for example. A message server computer 103 may also include downloadable computer programs and files for supporting, updating, or maintaining components on a client computer 101.

Web server computers 102 and message server computers 103 are typically, but not necessarily, server computers such as those available from Sun Microsystems, Hewlett-Packard, International Business Machines, etc. A client computer 101 may communicate with a web server computer 102 or a message server computer 103 using client-server protocol. Client-server computing is well known in the art and will not be further described here.

Figure 2:
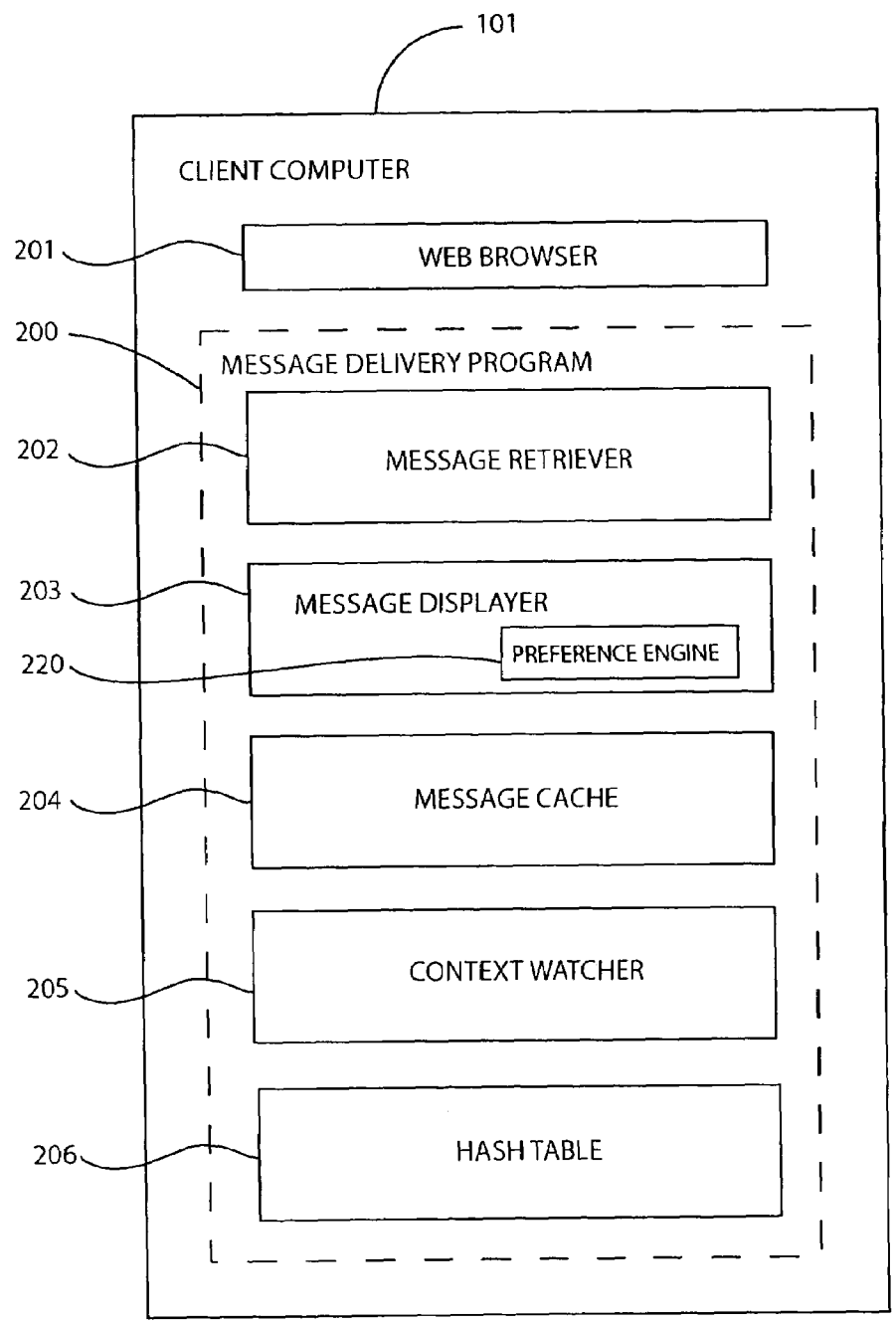
FIG. 2 schematically illustrates the components of a client computer in accordance with an embodiment of the present invention.

FIG. 2 schematically illustrates the components of a client computer 101 in accordance with an embodiment of the present invention. Client computer 101 may include a web browser 201 and a message delivery program 200. Delivery program 200 may include a message retriever 202, a message displayer 203, a message cache 204, a context watcher 205, and a hash table 206. Other components such as operating system components, application programs, and the like are not shown for clarity. In one embodiment, the components of client computer 101 shown in FIG. 2 are implemented in software. It should be understood, however, that the components of client computer 101 may also be implemented in hardware or a combination of hardware and software (e.g., firmware).

Client computer 101 may include a web browser 201. Web browser 201 may be any web browser or web client running on a client computer 101. For example, the Microsoft Internet Explorer™ web browser may be used as a web browser 201.

In one embodiment, delivery program 200 is downloadable from a message server computer 103. Delivery program 200 may be downloaded in conjunction with the downloading of another computer program. For example, delivery program 200 may be downloaded to a client computer 101 along with a utility program that is provided free of charge or at a reduced cost. The utility program may be provided to an end-user in exchange for the right to deliver messages to the end-user via message delivery program 200. In essence, revenue (e.g., advertising fees) from messages delivered to the end-user helps defray the cost of creating and maintaining the utility program.

Message retriever 202 may include computer-readable program code for requesting message units 301 (see FIG. 3) from message server computer 103. As will be explained later on in connection with FIG. 3, a message unit 301 may include a message content 302 for display on the screen of client computer 101. For example, a message content 302 may be an advertisement.

Message retriever 202 monitors web browser 201 for the uniform resource locator (URL) of web sites visited by an end-user surfing on the Internet. For each % domain visited by an end-user, message retriever 202 may send a request packet to message server computer 103. In one embodiment, a request packet includes:

(a) the end-user's unique identification (ID) number;
(b) the ID number of client computer 101;
(c) the local time;
(d) the domain name of the web site visited by the end-user; and
(e) a list of message units 301 stored in message cache 204.

In one embodiment, personal information such as the actual name of the end-user, credit card information, residence address, etc. is stored solely in client computer 101 to protect the end-user's privacy.

Message server computer 103 checks if there is a corresponding message unit 301 for each request packet received from client computer 101. If so, message server computer 103 sends the corresponding message unit 301 to message retriever 202. For example, message retriever 202 may send a request packet to message server computer 103 as an end-user navigates from "storekeeper.com" to "cars.com." If a message unit 301 is available for the domain "cars.com", message server computer 103 will send that message unit 301 to message retriever 202.

Client computer 101 may also include a hash table 206. Hash table 206 may contain information for determining whether a message unit 301 is available for a particular domain. This allows message retriever 202 to first query hash table 206 before sending a request packet to message server computer 103. If hash table 206 indicates that there is a message unit 301 for a domain visited by the end-user, message retriever 202 may proceed to send a request packet to message server computer 103. Otherwise, message retriever 202 may not send a request packet, thereby minimizing the amount of request packets sent to and processed by message server computer 103.

Message displayer 203 may include computer-readable program code for displaying the contents of a message unit 301. Message displayer 203 may display a message content using a variety of presentation vehicles including pop-ups, banners, message boxes, text boxes, sliders, separate windows, windows embedded in a web page, etc. As will be explained further below, message displayer 203 may also include a preference engine 220 for displaying messages based on end-user configurable settings. This provides end-users some control over messages delivered to them.

Each message unit 301 may include display rules 304 (see FIG. 3), which dictate when to display the contents of the message unit 301. As an end-user surfs the Internet, context watcher 205 checks message cache 204 for message units 301 meeting their respective display rules. If context watcher 205 finds such a message unit 301, context watcher 205 alerts message displayer 203 to display the contents of the message unit 301.

Figure 3:
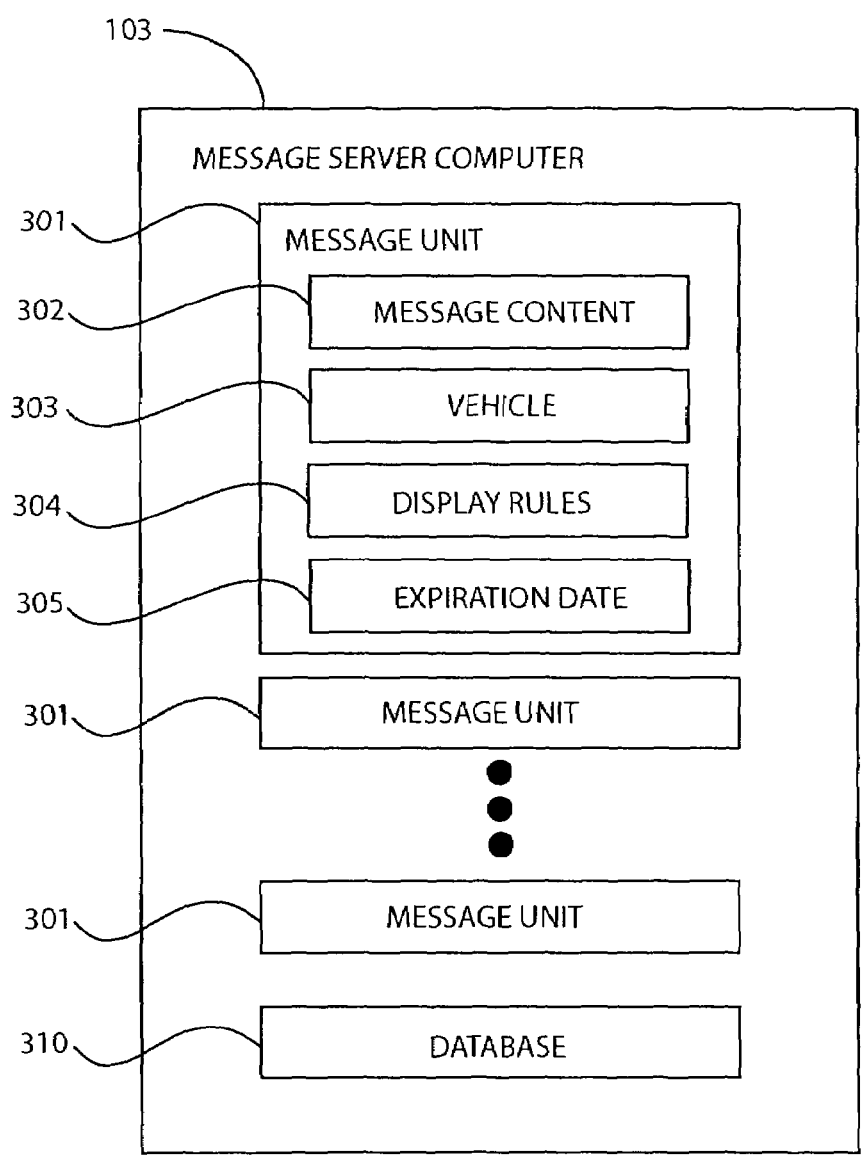
FIG. 3 schematically illustrates the components of a message server computer in accordance with an embodiment of the present invention.

FIG. 3 schematically illustrates the components of a message server computer 103 in accordance with an embodiment of the present invention. A message server computer 103 may include one or more message units 301 and a database 310. In one embodiment, the components of message server computer 103 shown in FIG. 3 are implemented in software. However, the components of message server computer 103 may also be implemented in hardware or a combination of hardware and software.

As mentioned, message server computer 103 receives request packets from a client computer 101. Each received request packet may include the domain name of the web site visited by an end-user. Message server computer 103 uses the domain name to find all message units 301 available for that web site. For example, a message unit 301 may include an advertisement from a car company that wants to display its advertisement to end-users visiting the "cars.com" web site. When a request packet indicates that an end-user is on "cars.com", the message unit 301 containing the car company's advertisement will be sent to the requesting client computer 101.

Message server computer 103 may also include a database 310 for keeping track of available message units 301 and end-user activities. Message server computer 103 may query database 310 for all message units 301 available for a particular web site.

As mentioned, in one embodiment, no personal information is sent to message server computer 103 to protect the privacy of end-users. Thus, in that embodiment, end-user activities such as the web sites visited by an end-user are tracked using the unique end-user ID included in each request packet. An end-user ID is not tied to any information that can be used to determine the actual identity of an end-user; thus, end-users may remain anonymous. As can be appreciated, end-user activities may be tracked for targeted advertising purposes.

Still referring to FIG. 3, a message unit 301 may include a message content 302, a vehicle 303, display rules 304, and an expiration date 305. Message content 302 may be the actual message displayed to end-users. Message content 302 may include hypertext markup language (HTML) code, text, images, etc. A sound file played when the message is displayed may also be included in message content 302.

Vehicle 303 indicates the presentation vehicle to be used in displaying message content 302. For example, vehicle 303 may call for the use of a pop-up, banner, message box, text box, slider, separate window, window embedded in a web page, etc.

Display rules 304 may include one or more rules for displaying message content 302. Display rules 304 may specify to display a message content 302 when an end-user navigates to a specific web page or as soon as the message unit 301 is received in a client computer 101. For example, a car company may contract with the operator of a message server computer 103 to deliver a message unit 301 containing an advertisement for a minivan (hereinafter, "minivan message unit"). The display rules 304 of the minivan message unit specifies that the minivan advertisement is to be displayed to end-users viewing the minivan web page of "cars.com". In this example, the minivan web page of cars.com has the URL "www.cars.com/minivans". When an end-user visits the main page (or any web page) of "cars.com", message retriever 202 (see FIG. 2) will send a request packet to message server computer 103 indicating that the end-user is on "cars.com". In response, message server computer 103 will send the minivan message unit to client computer 101. When the end-user navigates to the URL "www.cars.com/minivans", context watcher 205 will detect that the minivan message unit has been triggered for display (i.e., display rules 304 of the minivan message unit have been satisfied). Accordingly, context watcher 205 will then inform message displayer 203 that the message content 302 of the minivan message unit may be displayed.

Display rules 304 may also include: (a) a list of domain names at which the content of a message unit 301 is to be displayed, (b) URL sub-strings that will trigger displaying of the content of the message unit 301, and (b) time and date information. As can be appreciated, display rules 304 may also be extended to take into account additional information relating to an end-user (as identified by a corresponding end-user ID) such as the end-user's frequent flyer affiliation, club memberships, type of credit card used, hobbies and interests, and basic demographic information. End-user related information may be stored in client computer 101 or database 310 of message server computer 103. End-user related information may be used for targeted advertising purposes, for example.

As shown in FIG. 3, a message unit 301 may also include an expiration date 305. Expiration date 305 indicates the latest date and time the message unit 301 can still be displayed; expired message units 301 are not displayed regardless of whether their respective display rules 304 have been satisfied. Expired message units 301 may be removed from client computer 101.

Figure 4:
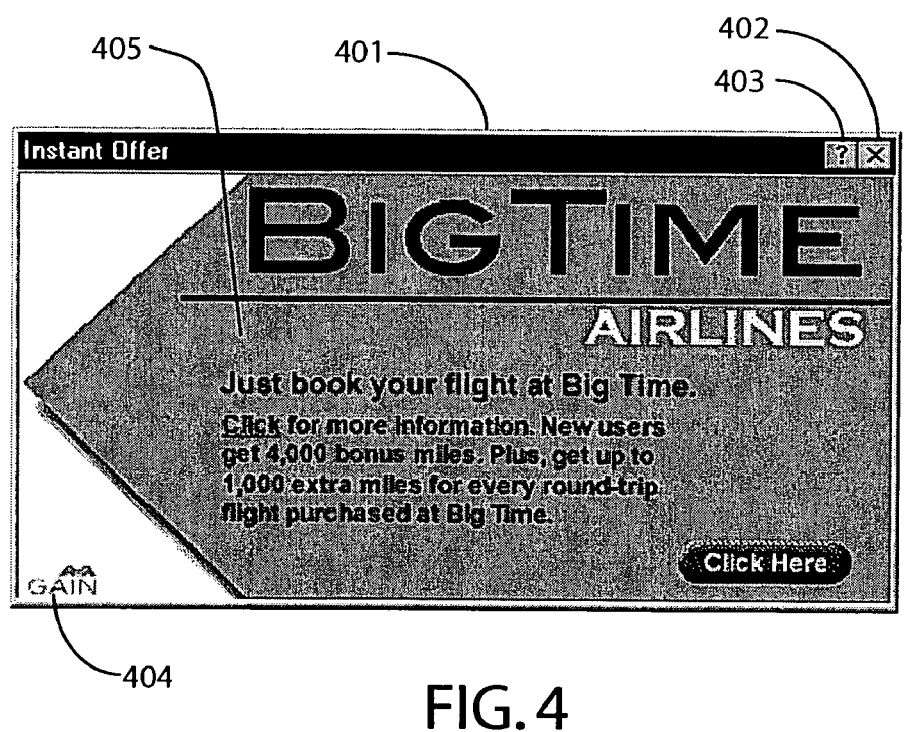
FIG. 4 shows a pop-up in accordance with an embodiment of the present invention.

Various presentation vehicles for displaying messages in accordance with embodiments of the present invention are now described beginning with FIG. 4. It is to be noted that as used in the present disclosure, a "presentation vehicle" includes any type of window or display area for displaying a message. Examples of presentation vehicles include pop-ups, banners, message boxes, text boxes, sliders, separate windows, windows embedded in a web page, etc. Furthermore, the term "pop-up" is used in the present disclosure to refer to a window that pops-up on a computer screen to display a message. The pop-up may be under other windows (sometimes referred to as a "pop-under") or on top of other windows.

Referring to FIG. 4, there is shown a pop-up 401 according to an embodiment of the present invention. Pop-up 401 may include a content area 405 where a message content 302 (see FIG. 3) may be displayed. In the example of FIG. 4, content area 405 displays an advertisement from BigTime Airlines. Pop-up 401 may also include a source indicator 404 to identify the source of the message. This allows pop-up 401 to be displayed along with other documents such as a web page without confusing end-users as to who generated pop-up 401. In the example of FIG. 4, source indicator 404 is a logo of the Gator Advertising and Information Network (GAIN)™ service; it informs end-users that the BigTime Airlines advertisement is from The Gator Corporation.

Pop-up 401 may also include icons 402 and 403, which may be activated by clicking on them with a mouse cursor. In one embodiment, icons 402 and 403 are each assigned a different activation sequence to prevent an end-user from inadvertently clicking on icon 403 when the end-user actually meant to click on icon 402 or vice versa. For example, icon 403 may require two clicks for activation, whereas icon 402 may only require a single click. The two clicks to activate icon 403 may be made one immediately after the other, be separated by any amount of time, be separated by a message or warning telling the end-user that icon 403 requires two clicks, or combinations thereof.

Icon 402 is a remove button, which in this case removes pop-up 401 off the computer screen. Icon 403 is a button for initiating the invocation of a preference setting panel (also referred to as "configuration panel"). Activating icon 403 may directly invoke a preference setting panel like panel 501 shown in FIG. 5A or one or more intermediate panels like panel 510 shown in FIG. 5B. In the present disclosure, the term "panel" includes any type of interface for entering a selection choice. A panel may be a pull down menu, a left-click menu, a window with hyperlinks, etc.

Figure 5A:
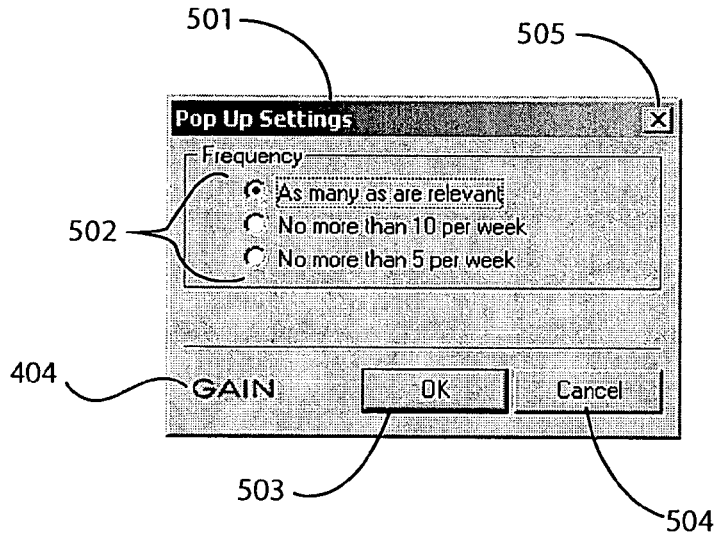
FIG. 5A shows a preference panel in accordance with an embodiment of the present invention.

As shown in FIG. 5A, panel 501 may include radio buttons 502 for setting the frequency at which messages are displayed. That is, panel 501 may allow end-users to specify the amount of messages displayed to them. In the example of FIG. 5A, an end-user may specify to see all relevant pop-ups, up to ten pop-ups a week, or up to five pop-ups a week. As can be appreciated, this provides end-users some control over messages delivered to them. Instead of giving total control of message delivery to the message provider, end-users can choose to see as many or as few messages as they want.

Figure 5B:
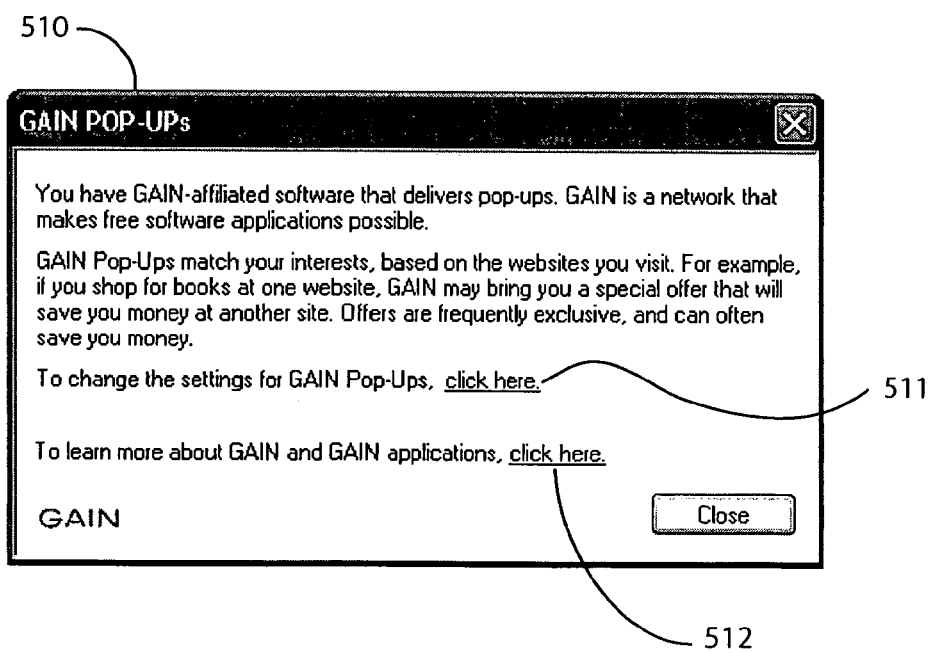
FIG. 5B shows an intermediate panel in accordance with an embodiment of the present invention.

Referring to FIG. 5B, one or more intermediate panels 510 may be displayed before displaying panel 501. For example, activating icon 403 (see FIG. 4) may invoke panel 510. Selecting choice 511 of panel 510, which is a hyperlink in this example, may then invoke panel 501. Selecting choice 512, which is also a hyperlink in this example, may invoke another panel providing additional information or functionality.

As can be appreciated, the capability to set the frequency at which messages are displayed is particularly desirable with presentation vehicles that go in and out of view. Examples of such presentation vehicles include pop-ups, sliders, and banners. For example, a pop-up may be displayed while an end-user is surfing on the Internet. The pop-up may be manually removed by the end-user, or may be automatically removed by message displayer 203 when the pop-up is no longer relevant (e.g., when the end-user leaves the domain that triggered the displaying of the pop-up). Some end-users may find it annoying to continually see pop-ups go in and out of view, while others may not be bothered by them. For those end-users who want to minimize the number of pop-ups that appear, they can simply invoke panel 501 and set a desired frequency using radio buttons 502.

In one embodiment, preference engine 220 (see FIG. 2) receives the settings entered in panel 501 shown in FIG. 5A. Preference engine 220, which keeps track of the number of messages displayed in client computer 101, uses the settings in informing message displayer 203 whether or not to display a message. For example, if radio buttons 502 indicate that an end-user wishes to receive all relevant messages, all message units 301 that have been triggered are displayed by message displayer 203. If radio buttons 502 indicate that an end-user does not want to receive more than 10 messages a week and more than 10 messages have already been displayed in a given week, triggered message units 301 are not displayed, and so on. Triggered message units 301 that are not displayed may be retained in message cache 204 until they expire.

As shown in FIG. 5A, panel 501 may also include a push-button 503 for setting the selection entered in radio buttons 502 and a push-button 504 for removing panel 501 without changing any setting. An icon 505 may be activated to remove panel 501 off the computer screen. Source indicator 404 identifies the source of panel 501.

Figure 6A:
FIG. 6A shows a slider in accordance with an embodiment of the present invention.

Turning now to FIG. 6A, there is shown a slider 601 in accordance with an embodiment of the present invention. Slider 601 may include a fixed panel 603 where a portion of a message content 302 (see FIG. 3) is displayed. Other portions of the message content 302 may be displayed in a sliding panel 602. In the example of FIG. 6A, sliding panel 602 contains an advertisement from ACME; source indicator 404 indicates that the ACME advertisement is from the GAIN service of The Gator Corporation.

Slider 601 may include an icon 403 for invoking a preference setting panel such as panel 501 shown in FIG. 5A. Intermediate panels (e.g., panel 510 shown in FIG. 5B) may also be displayed prior to displaying a panel 501. Icon 403 thus allows end-users the option to specify the number of messages displayed to them within a period of time. In this particular example, end-users may specify the number of sliding panels 602 that can be displayed per week.

Slider 601 may also include an icon 402 for removing slider 601 off the computer screen.

Figure 6B:
FIGS. 6B, 6C, and 6D schematically illustrate the movement of a sliding panel of the slider of FIG. 6A.
Figure 6C:
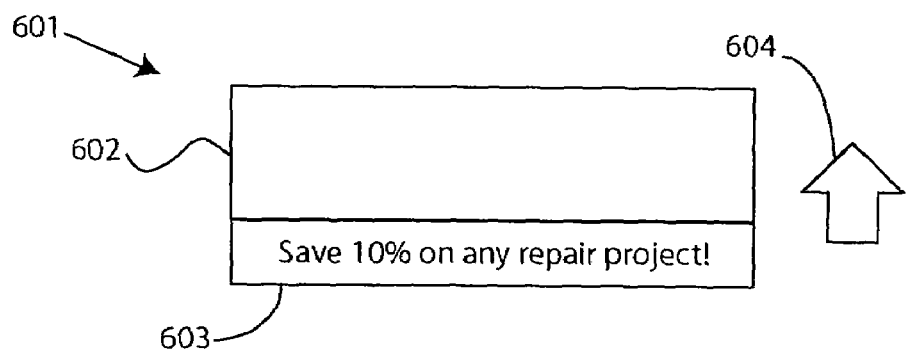
Figure 6D:
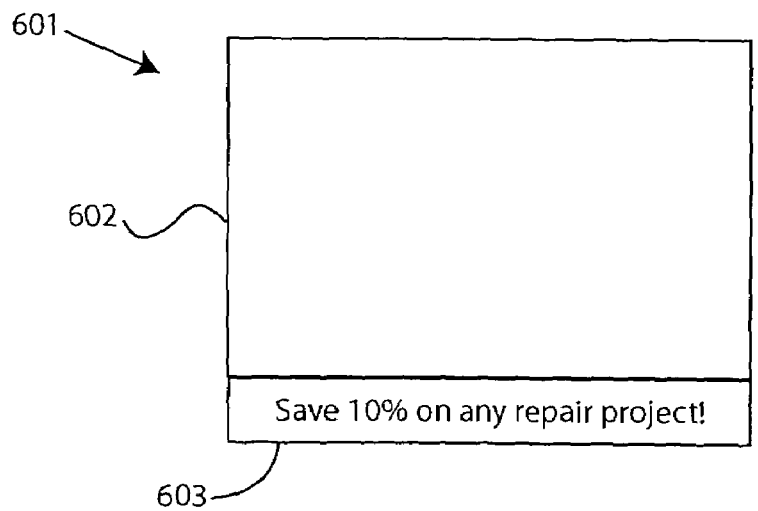

Slider 601 is so named because sliding panel 602 slides in and out of fixed panel 603. FIGS. 6B–6D schematically illustrate the movement of sliding panel 602. FIG. 6B shows slider 601 with sliding panel 602 fully retracted. FIG. 6C shows sliding panel 602 sliding in the direction indicated by arrow 604. FIG. 6D shows sliding panel 602 fully extended. Sliding panel 602 may also be retracted from a fully extended position. As can be appreciated, slider 601 only requires a full display area while sliding panel 602 is fully extended. Sliding panel 602 may be smoothly retracted and extended so as not to startle end-users.

In one embodiment, slider 601 is a polite slider. That is, sliding panel 602 automatically retracts out of the way when the message contained in it is no longer relevant. For example, sliding panel 602 may automatically retract when the end-user is no longer on the domain that triggered the displaying of the message. Sliding panel 602 may also automatically retract when the end-user has not placed a cursor on slider 601 for a period of time after sliding panel 602 has been fully extended into view. A polite slider 601 advantageously eliminates the need for end-users to manually remove irrelevant messages out of the way. This makes slider 601 more acceptable to end-users.

Figure 7:
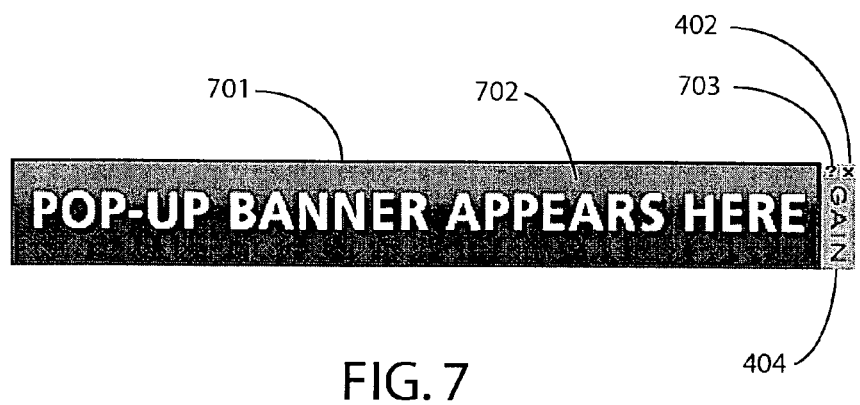
FIG. 7 shows a banner in accordance with an embodiment of the present invention.

FIG. 7 shows a banner 701 in accordance with an embodiment of the present invention. Banner 701 may include a content area 702 where a message content 302 (see FIG. 3) is displayed, an icon 402 for removing banner 701 off the computer screen, and a source indicator 404 for identifying the source of banner 701. Banner 701 may also include an icon 703 for invoking a preference setting panel such as panel 901, which is later discussed in connection with FIG. 9. Alternatively or in addition, icon 703 may be used to invoke a preference setting panel such as panel 501 shown in FIG. 5A. Intermediate panels (e.g., panel 510 shown in FIG. 5B) may also be displayed prior to displaying a panel 501 or a panel 901.

Figure 8:
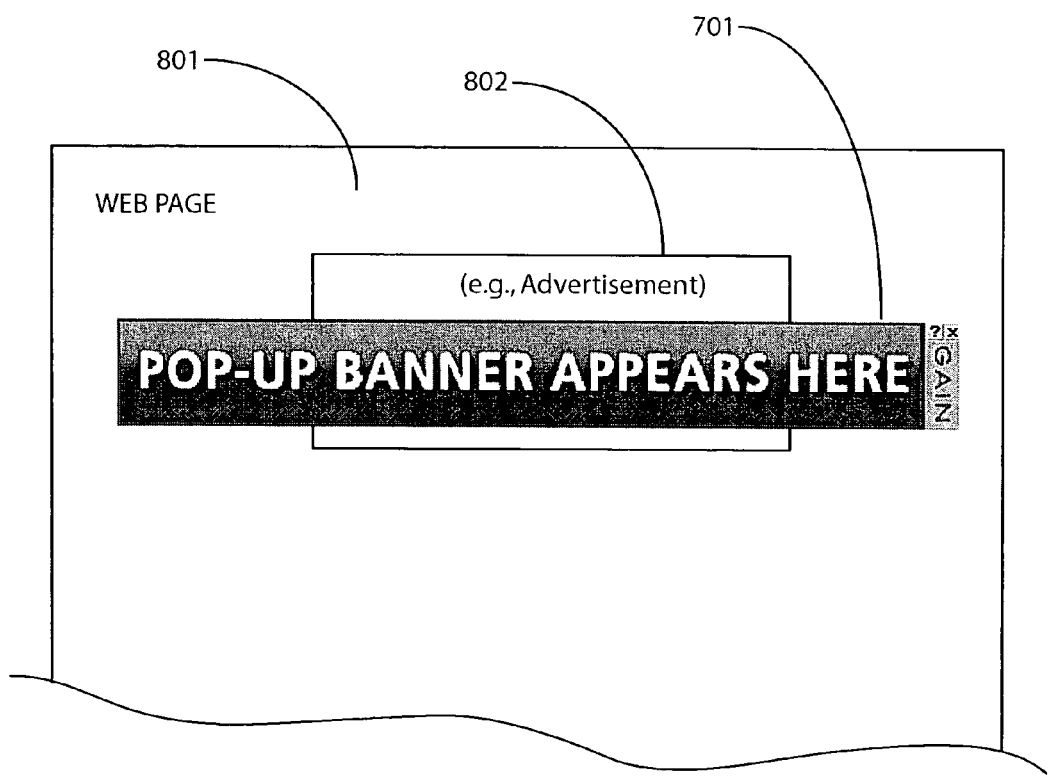
FIG. 8 shows the banner of FIG. 7 being displayed on top of a web page.

As shown in FIG. 8, banner 701 may be displayed on top of a web page 801. Specifically, banner 701 may be displayed over a presentation vehicle 802 embedded in web page 801.

Figure 9:
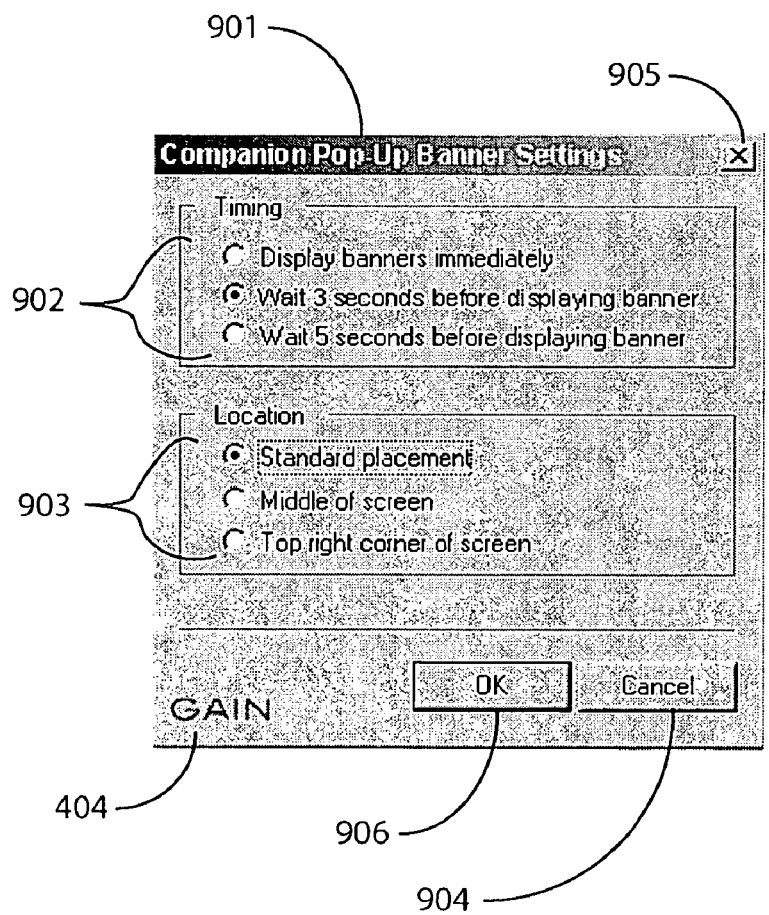
FIG. 9 shows another preference panel in accordance with an embodiment of the present invention.

FIG. 9 shows a preference panel 901 that may be invoked when icon 703 is activated. Panel 901 may include radio buttons 902 for specifying when to display subsequent banners 701 relative to the loading of a web page. In the example of FIG. 9, a banner 701 may be displayed as soon as it is available, three seconds after a web page is loaded, or five seconds after a web page is loaded. Delaying the displaying of a banner 701 gives end-users the chance to see what is under banner 701. For example, setting radio buttons 902 to 3 seconds gives an end-user 3 seconds to view the contents of presentation vehicle 802 (see FIG. 8) before displaying banner 701 on top of it.

Panel 901 also includes radio buttons 903 for specifying where to display subsequent banners 701. In the example of FIG. 9, a banner 701 may be displayed in a default location, in the middle of the computer screen, or in the top right corner of the computer screen. Of course, the example selection choices shown in FIG. 9 and in other figures of the present disclosure are provided for illustration purposes only; selection choices may vary depending on the application.

In one embodiment, preference engine 220 (see FIG. 2) receives all settings entered in panel 901. Preference engine 220 waits for the loading of a web page, then waits for an amount of time specified in radio buttons 902, and then informs message displayer 203 that any triggered message unit 301 may be displayed. For example, preference engine 220 may wait for an event notification from web browser 201 indicating that a web page has been completely loaded. After the specified delay time has elapsed, preference engine 220 may then inform message displayer 203 that triggered message units 301 may be displayed.

Based on the setting of radio buttons 903, preference engine 220 also informs message displayer 203 where to display a banner 701.

Panel 901 may also include a push-button 906 for setting the selections entered in radio buttons 902 and 903, and a push-button 904 for removing panel 901 without changing any setting. An icon 905 may be a button for removing panel 901 off the computer screen. Source indicator 404 identifies the source of panel 901.

As can be appreciated, the selections provided in panel 901 give end-users some control over the messages delivered to them. Instead of giving total control of message delivery to the message provider, end-users can specify when and where to display messages. By giving end-users control over the message delivery process, they are less likely to remove or uninstall the associated message delivery program. This is particularly advantageous in applications where the message delivery program generates revenue by, for example, displaying advertisements.

Figure 10:
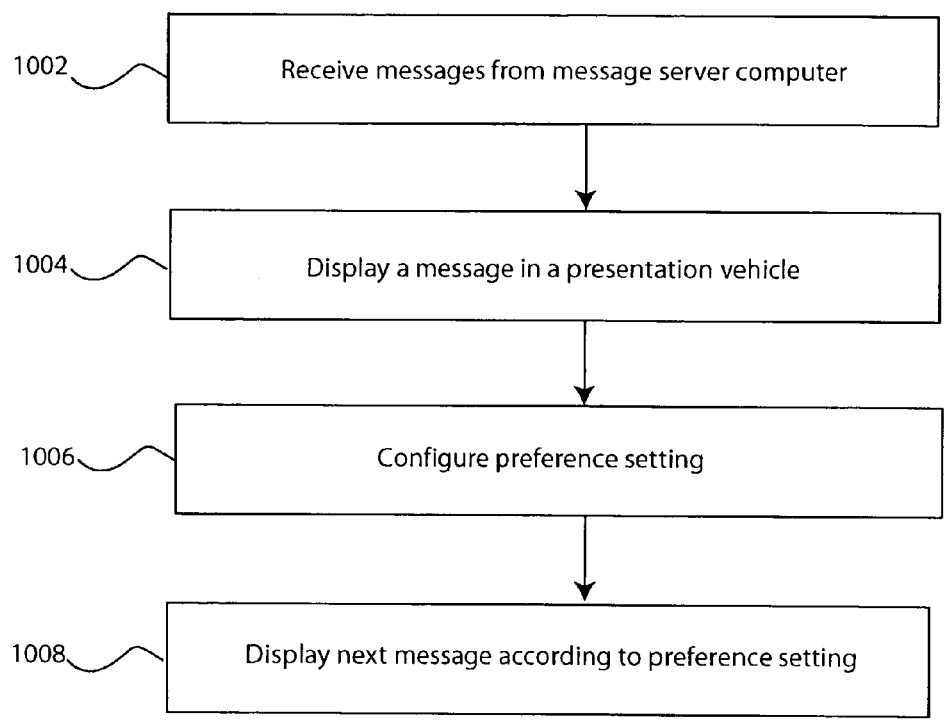
FIG. 10 shows a flow diagram of a method for displaying messages in accordance with an embodiment of the present invention.

FIG. 10 shows a flow diagram of a method for displaying messages in accordance with an embodiment of the present invention. In action 1002, a client computer receives messages from a message server computer. In action 1004, one of the messages is displayed in a presentation vehicle. The presentation vehicle includes an option for entering preference settings. In one embodiment, preference settings for specifying the number of messages that can be displayed within a period of time, the timing of the appearance of messages, and/or the location where messages are to be displayed may be entered. In action 1006, preference settings are configured by an end-user. In action 1008, the next message is displayed according to the preference settings.

While specific embodiments of the present invention have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A method of displaying messages in a computer, the method comprising:
   delivering a first product advertisement to a computer over a computer network, the first product advertisement being delivered to the computer based on a web site visited by an end-user;
   displaying the first product advertisement in a first presentation vehicle, the first presentation vehicle including a first icon for invoking a configuration panel for allowing the end-user to control how product advertisements are presented in the computer by entering a preference setting; and
   using the preference setting to determine how to display a second product advertisement in a second presentation vehicle.

2. The method of claim 1 wherein the preference setting allows the end-user to specify a certain limit on a maximum number of product advertisements that can be displayed in the computer within a period of time.

3. The method of claim 1 wherein the first presentation vehicle is displayed in a first location on a screen of the computer and the preference setting specifies a second location on the screen where the second presentation vehicle is displayed.

4. The method of claim 1 wherein the preference setting specifies a particular time setting on when to display the second presentation vehicle after loading of a web page.

5. The method of claim 1 wherein the first presentation vehicle comprises a second icon adjacent to the first icon, the first and second icons being assigned different activation sequences to prevent inadvertent activation of one of the icons.

6. The method of claim 1 wherein the first presentation vehicle comprises a pop-up displayed on top of a web browser in response to the end-user viewing a particular web page.

7. The method of claim 1 wherein the first presentation vehicle is a slider, the slider comprising a sliding panel that displays a product advertisement and automatically retracts when the end-user is no longer on a domain that triggered the displaying of the first product advertisement.

* * * * *